US010801509B2

(12) United States Patent
Franconi et al.

(10) Patent No.: US 10,801,509 B2
(45) Date of Patent: Oct. 13, 2020

(54) BLEED AIR SELECTOR VALVE

(71) Applicant: HONEYWELL INTERNATIONAL INC., Morris Plains, NJ (US)

(72) Inventors: Robert Franconi, New Hartford, CT (US); Paul Banta, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 165 days.

(21) Appl. No.: 16/046,640

(22) Filed: Jul. 26, 2018

(65) Prior Publication Data

US 2020/0032806 A1   Jan. 30, 2020

(51) Int. Cl.
| *F04D 27/00* | (2006.01) |
| *F02C 9/18* | (2006.01) |
| *G05D 7/03* | (2006.01) |
| *G05D 7/01* | (2006.01) |
| *F02C 6/08* | (2006.01) |
| *F01D 25/02* | (2006.01) |

(52) U.S. Cl.
CPC .............. *F04D 27/009* (2013.01); *F02C 9/18* (2013.01); *G05D 7/0133* (2013.01); *G05D 7/03* (2013.01); *F01D 25/02* (2013.01); *F02C 6/08* (2013.01); *F05D 2220/323* (2013.01); *F05D 2260/60* (2013.01)

(58) Field of Classification Search
CPC .. Y10T 137/87684; F04D 27/009; F02C 9/18; F02C 6/08; G05D 7/0133; G05D 7/03; F01D 25/02; F05D 2220/323; F05D 2260/60
USPC ........................................................ 137/506
See application file for complete search history.

(56) References Cited

U.S. PATENT DOCUMENTS

| 3,410,295 | A | * | 11/1968 | Malott | .................. | E02F 9/2239 |
| | | | | | | 137/114 |
| 5,063,963 | A | | 11/1991 | Smith | | |
| 5,161,364 | A | * | 11/1992 | Bruun | .................... | B64D 13/04 |
| | | | | | | 60/772 |
| 5,899,085 | A | * | 5/1999 | Williams | ............... | B64D 13/06 |
| | | | | | | 62/236 |
| 6,305,156 | B1 | | 10/2001 | Lui | | |
| 6,415,595 | B1 | * | 7/2002 | Wilmot, Jr. | .......... | B64D 13/006 |
| | | | | | | 60/266 |
| 8,955,794 | B2 | | 2/2015 | Mackin et al. | | |
| 9,382,841 | B2 | | 7/2016 | Bruno et al. | | |
| 9,580,180 | B2 | | 2/2017 | Jonqueres et al. | | |
| 9,650,967 | B2 | | 5/2017 | DeFrancesco | | |
| 9,849,992 | B2 | | 12/2017 | Goodman et al. | | |
| 9,879,610 | B2 | | 1/2018 | Moes | | |

(Continued)

FOREIGN PATENT DOCUMENTS

WO   2017077309 A1   5/2017

*Primary Examiner* — William M McCalister
(74) *Attorney, Agent, or Firm* — Lorenz & Kopf, LLP (57) ABSTRACT

A bleed air selector valve allows selection and extraction of bleed air from a plurality of different engine bleed air ports to optimize engine efficiency and to maintain bleed requirements using a single line replaceable unit. The bleed air selector valve uses a relatively simple arrangement of poppets, check valves, and thermostatic compensation to augment high and low temperature to within acceptable limits. The bleed air selector valve significantly reduces weight, cost, envelope, and system complexity as compared to known two-port bleed systems with heat exchanger thermal compensation.

18 Claims, 2 Drawing Sheets

(56) References Cited

U.S. PATENT DOCUMENTS

| | | | |
|---|---|---|---|
| 2008/0115503 A1 | 5/2008 | Vasquez et al. | |
| 2012/0045317 A1* | 2/2012 | Saladino | F02C 6/08 415/145 |
| 2012/0180509 A1* | 7/2012 | DeFrancesco | B64D 13/08 62/172 |
| 2012/0192578 A1 | 8/2012 | Finney | |
| 2014/0090458 A1* | 4/2014 | Gaully | F02C 6/08 73/112.01 |
| 2015/0107261 A1 | 4/2015 | Moes et al. | |
| 2015/0252731 A1* | 9/2015 | Riordan | F02C 9/18 60/785 |
| 2015/0275758 A1* | 10/2015 | Foutch | F02C 7/047 60/779 |
| 2015/0307183 A1* | 10/2015 | Bruno | B64D 13/06 244/209 |
| 2015/0314878 A1* | 11/2015 | Lukens | F02C 6/08 62/61 |
| 2016/0009399 A1* | 1/2016 | Schwarz | F02C 9/18 415/116 |
| 2016/0090917 A1* | 3/2016 | Bruno | B64D 13/06 415/145 |
| 2016/0201572 A1* | 7/2016 | Clauson | F16K 37/0091 73/47 |
| 2016/0237915 A1* | 8/2016 | Villanueva | F02C 6/08 |
| 2016/0355268 A1 | 12/2016 | Bruno | |
| 2017/0101937 A1* | 4/2017 | Schlarman | F02C 9/18 |
| 2017/0137132 A1 | 5/2017 | Wiegers et al. | |
| 2017/0268430 A1* | 9/2017 | Schwarz | B64D 13/06 |
| 2017/0356339 A1 | 12/2017 | Nithsdale | |
| 2018/0057172 A1 | 3/2018 | Sautron | |
| 2018/0073431 A1* | 3/2018 | Smith | F02C 9/18 |
| 2018/0134397 A1* | 5/2018 | Himmelmann | B64D 15/04 |
| 2018/0156121 A1* | 6/2018 | Snape | F04D 27/002 |
| 2018/0216538 A1* | 8/2018 | Papa | B64D 15/04 |
| 2018/0312263 A1* | 11/2018 | Army | F25B 9/06 |

\* cited by examiner

FIG. 2

BLEED AIR SELECTOR VALVE

STATEMENT REGARDING FEDERALLY SPONSORED RESEARCH OR DEVELOPMENT

This invention was made with Government support under W58RGZ-16-C-0046 awarded by Advanced Turbine Engine Company (ATEC). The Government has certain rights in the invention.

TECHNICAL FIELD

The present invention generally relates to bleed air valves, and more particularly relates to a multi-port bleed air selector valve

BACKGROUND

In many aircraft, bleed air from one or more gas turbine engines is used for various pneumatic systems, such as anti-icing and the environmental control system (ECS). This bleed air is typically extracted from one or more of the engine compressor stages to stay within performance boundary requirements and to improve engine efficiency over its operating range. Performance requirements for the bleed air are typically bounded by upper and lower pressure and temperature limitations.

Typical bleed air extraction systems for both commercial and military aircraft include components for conditioning the temperature (e.g., a heat exchanger) and pressure (e.g., a pressure regulating valve). This increases overall system weight, cost, size envelope, system complexity and may also reduce efficiency by unnecessarily discarding excess heat and air flow.

Hence, there is a need for a valve that selects and/or mixes the bleed air extraction from multiple separate engine bleed ports to optimize engine efficiency and to maintain bleed requirements and that reduces overall weight, cost, size envelope, and system complexity as compared to known bleed air selection devices. The present invention addresses at least this need.

BRIEF SUMMARY

The invention uniquely integrates the engine characteristics, the downstream pneumatic system needs and the operating conditions (i.e. the ambient environment) for optimal performance using a simple, mechanical device. The invention automatically takes advantage of the known operating relationships of the combined system. For example, on a hot day, with the engine operating at high power, high anti-ice flow is not required and in fact high bleed extraction flow is undesirable. The invention will inherently limit the bleed air flow to the benefit of both the engine and the rest of the system.

This summary provides a description of select concepts in a simplified form that are further described in the Detailed Description. This summary is not intended to identify key or essential features of the claimed subject matter, nor is it intended to be used as an aid in determining the scope of the claimed subject matter.

In one embodiment, a bleed air selector valve includes a flow body, a first check valve, a second check valve, a first flow regulating valve, and a second flow regulating valve. The flow body has a first inlet port, a second inlet port, a third inlet port, and an outlet port. The first check valve is disposed within the flow body between the first inlet port and the outlet port, and is moveable between a closed position and an open position. The second check valve is disposed within the flow body between the second inlet port and the outlet port, and is moveable between a closed position and an open position. The first flow regulating valve is disposed within the flow body between the third inlet port and the outlet port, and is movable between a plurality of open positions and a closed position. The second flow regulating valve is disposed within the flow body between the second check valve and the outlet port, and is movable between a plurality of open positions and a closed position. The third inlet port is in fluid communication with the outlet port when the first flow regulating valve is in one of the plurality of open positions, the third inlet port is fluidly isolated from the outlet port when the first flow regulating valve is in the closed position, the second inlet port is in fluid communication with the outlet port when (i) the second flow regulating valve is in one of its plurality of open positions and (ii) the second check valve is in its open position, and the second inlet port is fluidly isolated from the outlet port when the second check valve is in the closed position, regardless of the position of the second flow regulating valve.

In another embodiment, a bleed air selector valve includes a flow body, a first piston chamber, a second piston chamber, a third piston chamber, a first control pressure passage, a first flow passage, a second control pressure passage, a second flow passage, a first check valve, a second check valve, a first flow regulating valve, and a second flow regulating valve. The flow body has a first inlet port, a second inlet port, a third inlet port, and an outlet port. The first piston chamber is formed in the valve body and has a first vent opening, the second piston chamber is formed in the valve body and is spaced apart from the first piston chamber, and the third piston chamber is formed in the valve body and is spaced apart from the first and second piston chambers. The first control pressure passage is formed in the valve body, and is in fluid communication with the third inlet port and the second piston chamber. The first flow passage is disposed between the third inlet port, the outlet port, the first piston chamber, and the second piston chamber. The second control pressure passage is formed in the valve body, and is in fluid communication with the first inlet port and the third piston chamber. The second flow passage is disposed between the second inlet port, the outlet port, and the third piston chamber. The first check valve is disposed within the flow body between the first inlet port and the outlet port, and is moveable between a closed position and an open position. The second check valve is disposed within the flow body between the second inlet port and the outlet port, and is moveable between a closed position and an open position. The first flow regulating valve is disposed within the flow body between the third inlet port and the outlet port, and is further disposed within the first piston chamber, the second piston chamber, and the first flow passage. The first flow regulating valve is movable between a plurality of open positions and a closed position based in part on fluid pressures in the first piston chamber, the second piston chamber, the third inlet port and the first flow passage. The second flow regulating valve is disposed within the flow body between the second check valve and the outlet port, and is further disposed within the third piston chamber and the second flow passage. The second flow regulating valve is movable between a plurality of open positions and a closed position based in part on fluid pressures in the third piston chamber, the second flow passage, the second inlet port and the outlet port. The third inlet port is in fluid communication with the outlet port when the first flow regulating valve is in one of the plurality of open positions, and is fluidly isolated from the outlet port when the first flow regulating valve is in the closed position. The second inlet port is in fluid communication with the outlet port when (i) the second flow regulating valve is in one of its plurality of open positions and (ii) the second check valve is in its open position, and is fluidly isolated from the outlet port when the second check valve is in the closed position, regardless of the position of the second flow regulating valve.

In yet another embodiment, a bleed air selector valve includes a flow body, a first piston chamber, a second piston chamber, a third piston chamber, a first control pressure passage, a first flow passage, a second control pressure passage, a second flow passage, a first check valve, a second check valve, a first flow regulating valve, a second flow regulating valve, a first thermostatic control passage, a first thermostatic control valve, a first temperature sensitive actuator, a second thermostatic control passage, a second thermostatic control valve, and a second temperature sensitive actuator. The flow body has a first inlet port, a second inlet port, a third inlet port, and an outlet port. The first piston chamber is formed in the valve body and has a first vent opening, the second piston chamber is formed in the valve body and is spaced apart from the first piston chamber, and the third piston chamber is formed in the valve body and is spaced apart from the first and second piston chambers. The first control pressure passage is formed in the valve body, and is in fluid communication with the third inlet port and the second piston chamber. The first flow passage is disposed between the third inlet port, the outlet port, the first piston chamber, and the second piston chamber. The second control pressure passage is formed in the valve body, and is in fluid communication with the first inlet port and the third piston chamber. The second flow passage is disposed between the second inlet port, the outlet port, and the third piston chamber. The first check valve is disposed within the flow body between the first inlet port and the outlet port, and is moveable between a closed position and an open position. The second check valve is disposed within the flow body between the second inlet port and the outlet port, and is moveable between a closed position and an open position. The first flow regulating valve is disposed within the flow body between the third inlet port and the outlet port, and is further disposed within the first piston chamber, the second piston chamber, and the first flow passage. The first flow regulating valve is movable between a plurality of open positions and a closed position based in part on fluid pressures in the first piston chamber, the first flow passage and the second piston chamber. The second flow regulating valve is disposed within the flow body between the second check valve and the outlet port, and is further disposed within the third piston chamber and the second flow passage. The second flow regulating valve is movable between a plurality of open positions and a closed position based in part on fluid pressures in the third piston chamber and the second flow passage. The first thermostatic control passage has a first thermostatic control passage inlet and a first thermostatic control passage outlet; the first thermostatic control passage inlet is in fluid communication with the second piston chamber. The first thermostatic control valve and first control orifice are disposed within the first thermostatic control passage between the first thermostatic control passage inlet and the first thermostatic control passage outlet. The first thermostatic control valve is movable between a closed position, in which the first thermostatic control passage inlet is fluidly isolated from the first thermostatic control passage outlet, and a plurality of open positions, in which the first thermostatic control passage inlet is in fluid communication with the first thermostatic control passage outlet. The first temperature sensitive actuator is disposed at least partially in the outlet port and is coupled to the first thermostatic control valve, and is responsive to fluid temperature in the outlet port to move the first thermostatic control valve. The second thermostatic control passage has a second thermostatic control passage inlet and a second thermostatic control passage outlet, and the second thermostatic control passage inlet is in fluid communication with the third piston chamber. The second thermostatic control valve and second control orifice are disposed within the second thermostatic control passage between the second thermostatic control passage inlet and the second thermostatic control passage outlet. The second thermostatic control valve is movable between a closed position, in which the second thermostatic control passage inlet is fluidly isolated from the second thermostatic control passage outlet, and a plurality of open positions, in which the second thermostatic control passage inlet is in fluid communication with the second thermostatic control passage outlet. The second temperature sensitive actuator is disposed at least partially in the outlet port and coupled to the second thermostatic control valve, and is responsive to fluid temperature in the outlet port to move the second thermostatic control valve. The third inlet port is in fluid communication with the outlet port when the first flow regulating valve is in one of the plurality of open positions, and is fluidly isolated from the outlet port when the first flow regulating valve is in the closed position. The second inlet port is in fluid communication with the outlet port when (i) the second flow regulating valve is in one of its plurality of open positions and (ii) the second check valve is in its open position, and is fluidly isolated from the outlet port when the second check valve is in the closed position, regardless of the position of the second flow regulating valve. The first temperature sensitive actuator and the first thermostatic control valve are configured such that the first temperature sensitive actuator moves the first thermostatic control valve toward the closed position as temperature increases, and the second temperature sensitive actuator and the second thermostatic control valve are configured such that the second temperature sensitive actuator moves the second thermostatic control valve toward more open positions as temperature increases.

Furthermore, other desirable features and characteristics of the bleed air selector valve will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
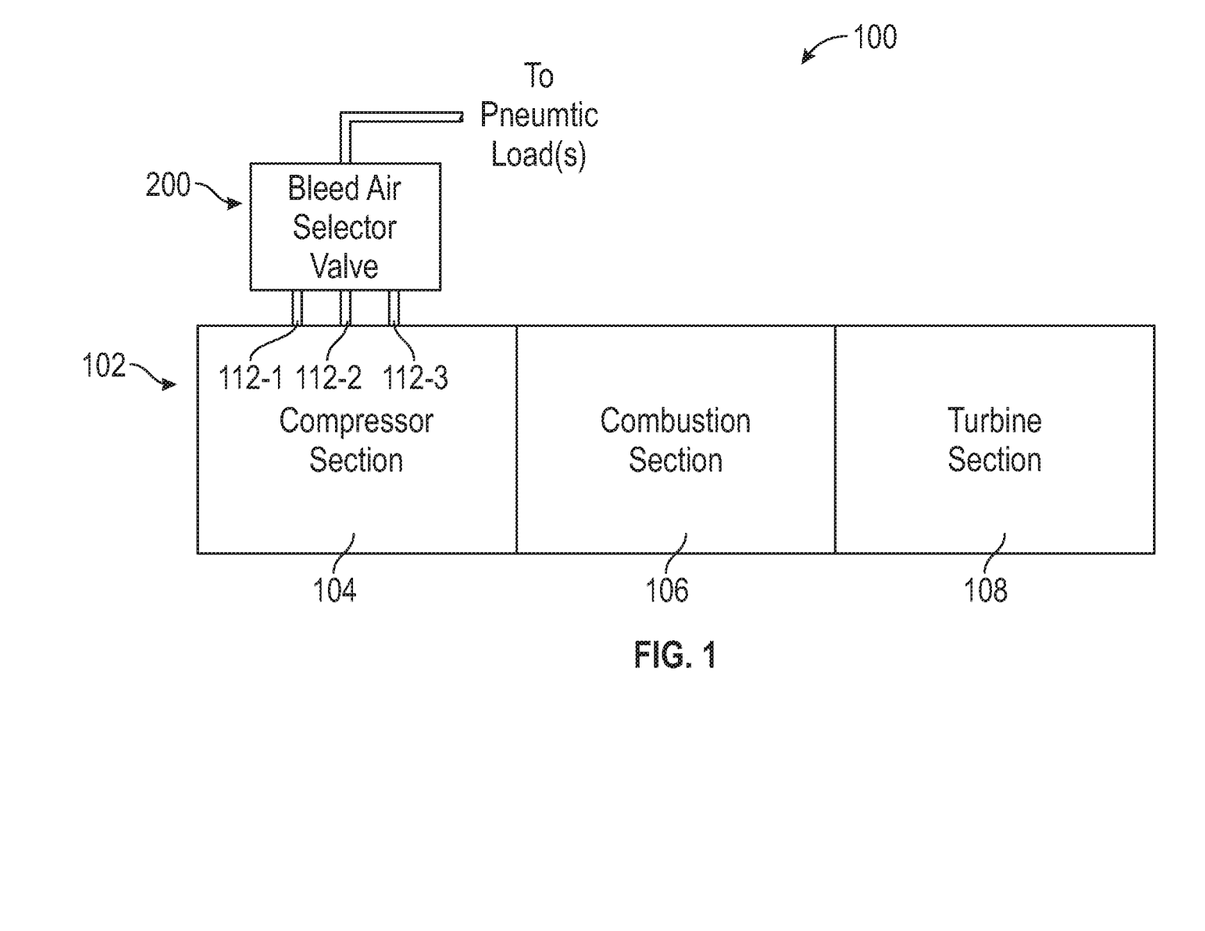
FIG. 1 depicts a simplified functional block diagram of a portion of a gas turbine engine system.

Referring first to FIG. 1, a simplified functional block diagram of a portion of a gas turbine engine system 100 is depicted and includes a gas turbine engine 102 and a bleed air selector valve 200. The gas turbine engine 102 includes at least a compressor section 104, a combustion section 106, and a turbine section 108. Before proceeding further, it should be noted that the gas turbine engine may be configured as a turbofan, turboprop, turboshaft or turbojet propulsion engine or as an auxiliary power unit. It may thus be configured as a single-spool, double-spool, or triple spool engine.

Returning to the description, during operation of the gas turbine engine 102, the compressor section 104 draws in ambient air, compresses it, and discharges a portion of the compressed air into the combustion section 106. Although the compressor section 104 is depicted using a single block, it will be appreciated that the compressor section 104 may include multiple compressors, one of which may be a fan (if the gas turbine engine is a turbofan propulsion engine).

In the combustion section 106, the compressed air supplied from the compressor section 106 is mixed with fuel that is controllably supplied from a non-illustrated fuel source via, for example, a non-illustrated fuel metering valve. The fuel/air mixture is combusted, via non-illustrated igniters, to generate high energy combusted gas that is then directed into the turbine section 108. The turbine section 108 may include one or more turbines.

As is generally known, a portion of the air that is compressed in the compressor section 104 may be supplied to one or more pneumatic systems. Thus, as FIG. 1 also depicts, the gas turbine engine additionally includes multiple bleed air outlet ports 112. Arbitrarily, three are depicted in FIG. 1—a first bleed air outlet port 112-1, a second bleed air outlet port 112-2, and a third bleed air outlet port 112-3. The bleed air outlet ports 112 are disposed at different locations along the compressor section 104 to receive compressed air of different pressures (and thus temperatures). For example, the first bleed air outlet port 112-1 is disposed to receive compressed air at a pressure that is lower than the compressed air supplied to the second and third bleed air outlet ports 112-2, 112-3 (e.g., relatively low pressure), the second bleed air outlet port 112-2 is disposed to receive compressed air at a pressure that is higher than the compressed air supplied to the first bleed air outlet port 112-1 but at a pressure that is lower than the compressed air supplied to the third bleed air outlet port 112-3 (e.g., relatively intermediate pressure), and the third bleed air outlet port 112-3 is disposed to receive compressed air at a pressure that is higher than the compressed air supplied to the first and second bleed air outlet ports 112-1, 112-2 (e.g., relatively high pressure).

The compressed air that flows through the bleed air outlet ports 112 is generally referred to as bleed air and, in the depicted embodiment, is supplied to the one or more pneumatic systems via the bleed air selector valve 200. The bleed air selector valve 200 is configured to selectively supply bleed air from one or more of the first, second, and third bleed air outlet ports 112 to the one or more pneumatic systems. The configuration of the bleed air selector valve 200 that allows this functionality will now be described.

Figure 2:
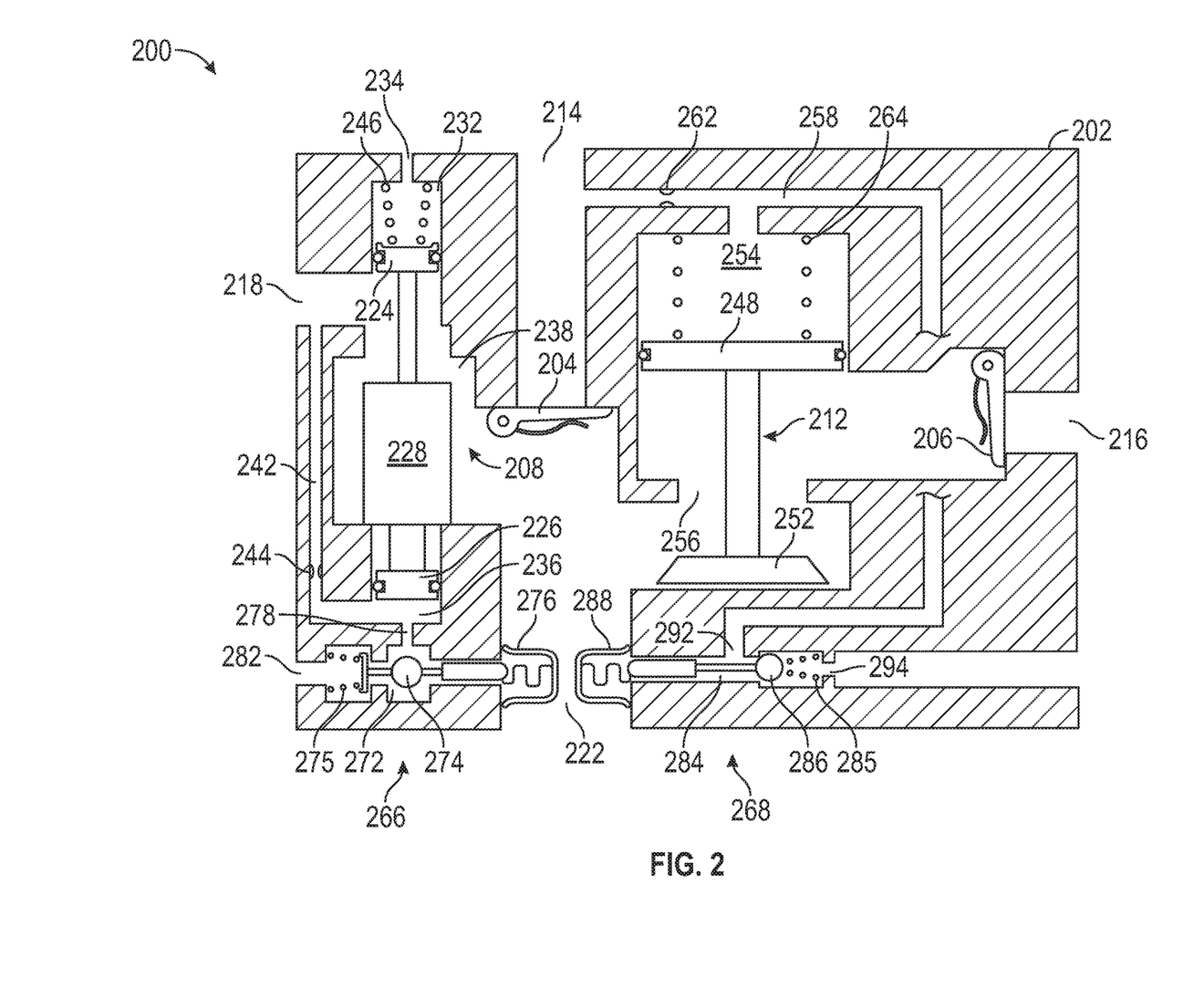
FIG. 2 depicts a schematic representation of one embodiment of a bleed air selector valve that may be included in the gas turbine engine system of FIG. 1.

Referring to FIG. 2, a schematic representation of one embodiment of the bleed air selector valve 200 is depicted. The depicted bleed air selector valve 200 includes at least a flow body 202, a first check valve 204, a second check valve 206, a first flow regulating valve 208, and a second flow regulating valve 212. The valve body 202 includes a first inlet port 214, a second inlet port 216, a third inlet port 218, and an outlet port 222. Preferably, when installed in the gas turbine engine system of FIG. 1, the first inlet port 214 is in fluid communication with the first bleed air outlet port 112-1, the second inlet port 216 is in fluid communication with the second bleed air outlet port 112-2, the third inlet port 218 is in fluid communication with the third bleed air outlet port 112-3, and the outlet port 222 is in fluid communication with the one or more pneumatic systems.

The first and second check valves 204, 206 are both disposed within the flow body 202. The first check valve 204 is disposed within the flow body 202 between the first inlet port 214 and the outlet port 222. The first check valve 204 is moveable between a closed position, which is the position depicted in FIG. 2, and an open position. The second check valve 206 is disposed within the flow body 202 between the second inlet port 216 and the outlet port 222. The second check valve 206 is also moveable between a closed position, which is the position depicted in FIG. 2, and an open position. As FIG. 2 further depicts, the first and second check valves 204, 206 are both spring biased to the closed position. In alternative embodiments, however, the first and second check valve 204, 206 may be gravity-assisted or simply reverse pressure actuated closed in lieu of a spring. The first and second check valves 204, 206 will move to open positions when the differential pressure across the check valves 204, 206 is at a predetermined magnitude.

The first and second flow regulating valves 208, 212 are also disposed within the flow body 202. The first flow regulating valve 208 is disposed within the flow body 202 between the third inlet port 218 and the outlet port 222, and is movable between a plurality of open positions, one of which is depicted in FIG. 2, and a closed position. Thus, the third inlet port 218 is in fluid communication with the outlet port 222 when the first flow regulating valve 208 is in one of its plurality of open positions. Conversely, the third inlet port 208 is fluidly isolated from the outlet port 222 when the first flow regulating valve 208 is in its closed position.

The first flow regulating valve 208 may be variously configured to implement its functionality. In the depicted embodiment, however, it is configured as a piston poppet regulating valve that, at least in the depicted embodiment, includes a first control piston 224, a second control piston 226, and a first valve element 228. The first control piston 224 is movably disposed within a first piston chamber 232 that is formed in the valve body 202 and that has a first vent opening 234. The second control piston 226 is movably disposed within a second piston chamber 236 that is formed in the valve body 202 and spaced apart from the first piston chamber 232. The valve element 228 is disposed within a first flow passage 238 that is located between the third inlet port 218, the outlet port 222, the first piston chamber 232, and the second piston chamber 236.

As FIG. 2 further depicts, the valve body 202 also has a first control pressure passage 242 formed therein. The first control pressure passage 242 is in fluid communication with the third inlet port 218 and the second piston chamber 236, and, at least in the depicted embodiment, includes a first control orifice 244. In the depicted embodiment, a first bias spring 246 is disposed within the first piston chamber 232 and engages the first control piston 224. The first bias spring 246 supplies a force that urges the first flow regulating valve 208 toward an open position.

With the above-described configuration, in which the first flow regulating valve 208 is disposed within the first piston chamber 232, the second piston chamber 236, and the first flow passage 238, the first flow regulating valve 208 is moved between its plurality of open positions and its closed position based in part on the fluid pressures in the first piston chamber 232, the second piston chamber 236, the third inlet port 218 and the first flow passage 238.

The second flow regulating valve 212 is disposed within the flow body 202 between the second check valve 206 and the outlet port 222, and is also movable between a plurality of open positions, one of which is depicted in FIG. 2, and a closed position. Thus, the second inlet port 216 is in fluid communication with the outlet port 222 when the second flow regulating valve 212 is in one of its plurality of open positions and the second check valve 206 is in one of its plurality of open positions. Conversely, the second inlet port 216 is fluidly isolated from the outlet port 222 when the second flow regulating valve 212 is in the closed position, or when the second check valve 206 is in the closed position, regardless of the position of the second flow regulating valve 212.

The second flow regulating valve 212, like the first flow regulating valve 208, may also be variously configured to implement its functionality. In the depicted embodiment, it too is configured as a piston poppet regulating valve that, at least in the depicted embodiment, includes a third control piston 248 and a second valve element 252. The third control piston 248 is movably disposed within a third piston chamber 254 that is formed in the valve body 222. The second valve element 252 is disposed within a second flow passage 256 that is located between the second inlet port 216, the outlet port 222, and the third piston chamber 254.

As FIG. 2 further depicts, the valve body 202 additionally has a second control pressure passage 258 formed therein. The second control pressure passage 258 is in fluid communication with the first inlet port 214 and the third piston chamber 254, and, at least in the depicted embodiment, includes a second control orifice 262. In the depicted embodiment, a second bias spring 264 is disposed within the third piston chamber 254 and engages the third control piston 248. The second bias spring 264 supplies a force that urges the second flow regulating valve 212 toward an open position.

With the above-described configuration, in which the second flow regulating valve 212 is disposed within the third piston chamber 254 and the second flow passage 256, the second flow regulating valve 212 is moved between its plurality of open positions and its closed position based in part on the fluid pressures in the third piston chamber 254, the second flow passage 256 and the second inlet port 216.

The bleed air selector valve 200 may also be configured to implement thermostatic compensation. To do so, the bleed air selector valve 200 may also include first and second thermostatic compensation assemblies 266, 268. The first thermostatic compensation assembly 266 includes a first thermostatic control passage 272, a first thermostatic control valve element 274, and a first temperature sensitive actuator 276. The first thermostatic control passage 272 has a first thermostatic control passage inlet 278 and a first thermostatic control passage outlet 282. The first thermostatic control passage inlet 278 is in fluid communication with the second piston chamber 236.

The first thermostatic control valve element 274 is disposed within the first thermostatic control passage 272 between the first thermostatic control passage inlet 278 and the first thermostatic control passage outlet 282. The first thermostatic control valve 274 is movable between a closed position and a plurality of open positions. In the closed position, the first thermostatic control passage inlet 278 is fluidly isolated from the first thermostatic control passage outlet 282. In any of the plurality of open positions, one of which is depicted in FIG. 2, the first thermostatic control passage inlet 278 is in fluid communication with the first thermostatic control passage outlet 282. In the depicted embodiment, the first thermostatic compensation assembly 266 also includes a first follower spring 275 that is configured to supply a force that urges the first thermostatic control valve 274 to follow the first temperature sensitive actuator 276.

The first temperature sensitive actuator 276 is disposed at least partially in the outlet port 222 and is coupled to the first thermostatic control valve 274. The first temperature sensitive actuator 276 is responsive to fluid temperature in the outlet port 222 to move the first thermostatic control valve 274. In particular, the first temperature sensitive actuator 276 and the first thermostatic control valve 274 are configured such that the first temperature sensitive actuator 276 moves the first thermostatic control valve 274, against the force of the first follower spring 275, toward the closed position as fluid temperature in the outlet port 222 increases, and vice-versa the first temperature sensitive actuator 276 moves the first thermostatic control valve 274, in conjunction with the force of the first follower spring 275, toward more open positions as fluid temperature in the outlet port 222 decreases. It will be appreciated that the first temperature sensitive actuator 276 may be variously implemented, but in the depicted embodiment it is implemented using a fluid-filled actuator that expands with increasing temperature, and contracts with decreasing temperature.

The second thermostatic compensation assembly 268 includes a second thermostatic control passage 284, a second thermostatic control valve element 286, and a second temperature sensitive actuator 288. The second thermostatic control passage 284 has a second thermostatic control passage inlet 292 and a second thermostatic control passage outlet 294. The second thermostatic control passage inlet 292 is in fluid communication with the second control pressure passage 258, and thus is also in fluid communication with the third piston chamber 254 and the first inlet 214.

The second thermostatic control valve 286 is disposed within the second thermostatic control passage 284 between the second thermostatic control passage inlet 292 and the second thermostatic control passage outlet 294. The second thermostatic control valve 286 is movable between a closed position and a plurality of open positions. In the closed position, which is the position depicted in FIG. 2, the second thermostatic control passage inlet 292 is fluidly isolated from the second thermostatic control passage outlet 294. In any of the plurality of open positions, the second thermostatic control passage inlet 292 is in fluid communication with the second thermostatic control passage outlet 294. In the depicted embodiment, the second thermostatic compensation assembly 268 also includes a second follower spring 285 that is configured to supply a force that urges the second thermostatic control valve 286 to follow the second temperature sensitive actuator 288.

The second temperature sensitive actuator 288 is disposed at least partially in the outlet port 222 and is coupled to the second thermostatic control valve 286. The second temperature sensitive actuator 288 is responsive to fluid temperature in the outlet port 222 to move the second thermostatic control valve 286. In particular, the second temperature sensitive actuator 288 and the second thermostatic control valve 286 are configured such that the second temperature sensitive actuator 288 moves the second thermostatic control valve 286, against the force of the second follower spring 285, toward more open positions as fluid temperature in the outlet port 222 increases, and vice-versa the second temperature sensitive actuator 288 moves the second thermostatic control valve 286, in conjunction with the force of the second follower spring 285, toward the closed position as fluid temperature in the outlet port 222 decreases. It will be appreciated that the second temperature sensitive actuator 288 may also be variously implemented, but in the depicted embodiment it is implemented using a fluid-filled actuator that expands with increasing temperature, and contracts with decreasing temperature.

Having described the overall structure of the bleed air selector valve 200, and the arrangement and functions of its constituent components, the operation of the bleed air selector valve 200, when installed in a gas turbine engine system, such as the system 100 of FIG. 1, will now be described. In so doing, it is noted that the positions of each of the valves depicted in FIG. 2 are the positions at the start of operation of the gas turbine engine 102 (when there is no pressure at any of the three inlet ports).

When gas turbine engine operation begins, the first and second flow regulating valves 208, 212 are both open, and the first and second check valves 204, 206 are both closed. Thus, compressed air from the third bleed air outlet 112-3 (e.g., high pressure), via the third inlet port 218, is the sole supply to the pneumatic systems. Because the first and second check valves 204, 206 are both closed, backflow into the first and second bleed air outlets 112-1, 112-2, via the first and second inlet ports 204, 206, respectively, is prevented. It should be appreciated that the third inlet port 218 size can be controlled (by design) to limit the flow from the third bleed air outlet 112-3 and protect the engine high pressure compressor from being over-bled.

Thereafter, as the gas turbine engine increases in power, the pressure at the third inlet port 218 increases (due to pressure at the third bleed air outlet 112-3 increasing) and the first flow regulating valve 208 will begin closing to limit the pressure in the first flow passage 238 (and thus the outlet port 222). Simultaneously, the pressure at the second inlet port 216 will increase (due to pressure at the second bleed air outlet 112-2 increasing) above the limited pressure at the outlet port 222. As a result, the second check valve 206 will open and compressed air from the second bleed air outlet 112-2 (e.g., intermediate pressure), via the second inlet port 216 will mix with the bleed air from the first flow passage 238; the mixed flow is supplied to the pneumatic systems through the outlet port 222. As the gas turbine engine further increases in power, the first flow regulating valve 208 fully closes and all of the airflow supplied to the pneumatic systems through the outlet port 222 is supplied from the second bleed air outlet 112-2, via the second inlet port 216. Because, as described above, the pressure at the outlet port 222 is higher than at the first bleed air outlet 112-1, the first check valve 204 remains closed. It should be appreciated that the second inlet port 216 size can be controlled (by design) to limit the flow from the second bleed air outlet 112-2 and protect the engine intermediate pressure compressor from being over-bled.

Thereafter, as the gas turbine engine continues to increase in power, the pressure at the second inlet port 216 continues to increase (due to pressure at the second bleed air outlet 112-2 increasing), and the second flow regulating valve 212 will begin closing to limit the pressure to the outlet port 222. Simultaneously, the pressure at the first inlet port 214 will increase (due to pressure at the first bleed air outlet 112-1 increasing) above the limited pressure at the outlet port 222. As a result, the first check valve 204 will open and compressed air from the first bleed air outlet 112-1 (e.g., low pressure), via the first inlet port 214 will mix with the bleed air from the second flow passage 256; the mixed flow is supplied to the pneumatic systems through the outlet port 222. As the gas turbine engine further increases in power, the second flow regulating valve 212 fully closes and all of the airflow supplied to the pneumatic systems through the outlet port 222 is supplied from the first bleed air outlet 112-1, via the first inlet port 214. It should be appreciated that the first inlet port 214 size can be controlled (by design) to limit the flow from the first bleed air outlet 112-1 and protect the engine low pressure compressor from being over-bled.

The first and second thermostatic compensation assemblies 266, 268 provide temperature control. Specifically, these assemblies function to increase bleed air temperature if it is too low (below a first predetermined temperature) or to decrease bleed air temperature if it is too high (above a second predetermined temperature).

As noted above, the first thermostatic compensation assembly 266 is configured such that the first temperature sensitive actuator 276 moves the first thermostatic control valve element 274, in conjunction with the force of the first follower spring 275, toward more open positions as fluid temperature in the outlet port 222 decreases. As may be appreciated, opening the first thermostatic control valve element 274 increases flow through the first thermostatic compensation assembly 266, and thus decreases the pressure in the second piston chamber 236. This decreased pressure will result in the first flow regulating valve 208 to move to a more open position. Thus, if bleed air flow via either the first or second inlet ports 214, 216 is too low (below the first predetermined temperature), bleed air flow via the third inlet port 218 will increase bleed air temperature. It should be noted that the pressure in the second piston chamber 236 varies due to the flow through the thermostatic compensation assembly 266 working in series with the first control orifice 244. Of particular interest is that when the temperature supplied to the pneumatic systems is low and needs to be increased it is also important that the flow capacity be maintained. The first thermostatic assembly 266, while adjusting the control of the first flow regulating valve 208, will tend to increase the flow to the pneumatic systems.

As was also noted above, the second thermostatic compensation assembly 268 is configured such that the second temperature sensitive actuator 288 moves the second thermostatic control valve element 286, against the force of the second follower spring 285, toward more open positions as fluid temperature in the outlet port 222 increases. As may be appreciated, opening the second thermostatic control valve element 286 increases flow through the second thermostatic compensation assembly 268, and working in conjunction with the second control orifice 262 decreases the pressure in the third piston chamber 254. This decreased pressure will result in the second flow regulating valve 212 moving toward its closed position, decreasing the differential pressure across the first check valve 204 and allowing it to open. Thus, if the temperature of the bleed flow via second inlet port 216 is too high (above the second predetermined temperature), bleed air flow via the first inlet port 214 will mix and decrease bleed air temperature supplied to the pneumatic systems through the outlet port 222. Of particular interest is that when the temperature supplied to the pneumatic systems is high and needs to be reduced it is desirable to reduce the total flow. The second thermostatic assembly 268, while adjusting the control of the second flow regulating valve 212, will inherently tend to decrease the flow to the pneumatic systems.

The bleed air selector valve described herein allows selection and extraction of bleed air from three different engine bleed air ports to optimize engine efficiency and to maintain bleed requirements using a single line replaceable unit. The disclosed bleed air selector valve uses a relatively simple arrangement of poppets, check valves, and thermostatic compensation to augment high and low temperature to within acceptable limits. The disclosed bleed air selector valve significantly reduces weight, cost, envelope, and system complexity and improves reliability as compared to known two-port bleed systems with heat exchanger thermal compensation. The disclosed valve is autonomous and self-contained, and thus requires no external inputs or monitoring for control In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A bleed air selector valve, comprising:
    a flow body having a first inlet port, a second inlet port, a third inlet port, and an outlet port;
    a first piston chamber formed in the valve body and having a first vent opening;
    a second piston chamber formed in the valve body and spaced apart from the first piston chamber;
    a first control pressure passage formed in the valve body, the first control pressure passage in fluid communication with the third inlet port and the second piston chamber; and
    a first flow passage disposed between the third inlet port, the outlet port, the first piston chamber, and the second piston chamber;
    a first check valve disposed within the flow body between the first inlet port and the outlet port, the first check valve moveable between a closed position and an open position;
    a second check valve disposed within the flow body between the second inlet port and the outlet port, the second check valve moveable between a closed position and an open position;
    a first flow regulating valve disposed within the first piston chamber, the second piston chamber, and the first flow passage, and is moved between a plurality of open positions and a closed position based in part on fluid pressures in the first piston chamber and the second piston chamber; and
    a second flow regulating valve disposed within the flow body between the second check valve and the outlet port, the second flow regulating valve movable between a plurality of open positions and a closed position,
    wherein:
        the third inlet port is in fluid communication with the outlet port when the first flow regulating valve is in one of the plurality of open positions,
        the third inlet port is fluidly isolated from the outlet port when the first flow regulating valve is in the closed position,
        the second inlet port is in fluid communication with the outlet port when (i) the second flow regulating valve is in one of its plurality of open positions and (ii) the second check valve is in one of its plurality of open positions, and
        the second inlet port is fluidly isolated from the outlet port when the second check valve is in the closed position, regardless of the position of the second flow regulating valve.

2. The bleed air selector valve of claim 1, wherein:
    the first flow regulating valve comprises a first control piston, a second control piston, and a first valve element;
    the first control piston is movably disposed within the first piston chamber;
    the second control piston is movably disposed within the second piston chamber; and
    the valve element is disposed within the first flow passage.

3. The bleed air selector valve of claim 2, further comprising:
    a first bias spring disposed within the first piston chamber and engaging the first control piston, the first bias spring supplying a force that urges the first flow regulating valve toward an open position.

4. The bleed air selector valve of claim 1, further comprising:
    a first thermostatic control passage having a first thermostatic control passage inlet and a first thermostatic control passage outlet, the first thermostatic control passage inlet in fluid communication with the second piston chamber;

a first thermostatic control valve disposed within the first thermostatic control passage between the first thermostatic control passage inlet and the first thermostatic control passage outlet, the first thermostatic control valve movable between a closed position, in which the first thermostatic control passage inlet is fluidly isolated from the first thermostatic control passage outlet, and a plurality of open positions, in which the first thermostatic control passage inlet is in fluid communication with the first thermostatic control passage outlet; and a first temperature sensitive actuator disposed at least partially in the outlet port and coupled to the first thermostatic control valve, the first temperature actuator responsive to fluid temperature in the outlet port to move the first thermostatic control valve, wherein the first temperature sensitive actuator and the first thermostatic control valve are configured such that the first temperature sensitive actuator moves the first thermostatic control valve toward the closed position as temperature increases.

5. The bleed air selector valve of claim 1, further comprising:

a third piston chamber formed in the valve body;

a second control pressure passage formed in the valve body, the second control pressure passage in fluid communication with the first inlet port and the third piston chamber; and a second flow passage disposed between the second inlet port, the outlet port, and the third piston chamber, wherein the second flow regulating valve is disposed within the third piston chamber, and the second flow passage, and is moved between its plurality of open positions and its closed position based in part on fluid pressures in the third piston chamber and the second flow passage.

6. The bleed air selector valve of claim 5, wherein:

the second flow regulating valve comprises a third control piston and a second valve element;

the third control piston is movably disposed within the third piston chamber; and the second valve element is disposed within the second flow passage.

7. The bleed air selector valve of claim 6, further comprising:

a second bias spring disposed within the third piston chamber and engaging the third control piston, the second bias spring supplying a force that urges the second flow regulating valve toward an open position.

8. The bleed air selector valve of claim 5, further comprising:

a second thermostatic control passage having a second thermostatic control passage inlet and a second thermostatic control passage outlet, the second thermostatic control passage inlet in fluid communication with the third piston chamber;

a second thermostatic control valve disposed within the second thermostatic control passage between the second thermostatic control passage inlet and the second thermostatic control passage outlet, the second thermostatic control valve movable between a closed position, in which the second thermostatic control passage inlet is fluidly isolated from the second thermostatic control passage outlet, and a plurality of open positions, in which the second thermostatic control passage inlet is in fluid communication with the second thermostatic control passage outlet; and a second temperature sensitive actuator disposed at least partially in the outlet port and coupled to the second thermostatic control valve, the second temperature actuator responsive to fluid temperature in the outlet port to move the second thermostatic control valve, wherein the second temperature sensitive actuator and the second thermostatic control valve are configured such that the second temperature sensitive actuator moves the second thermostatic control valve toward more open positions as temperature increases.

9. A bleed air selector valve, comprising:

a flow body having a first inlet port, a second inlet port, a third inlet port, and an outlet port;

a first piston chamber formed in the valve body and having a first vent opening;

a second piston chamber formed in the valve body and spaced apart from the first piston chamber;

a third piston chamber formed in the valve body and spaced apart from the first and second piston chambers;

a first control pressure passage formed in the valve body, the first control pressure passage in fluid communication with the third inlet port and the second piston chamber;

a first flow passage disposed between the third inlet port, the outlet port, the first piston chamber, and the second piston chamber;

a second control pressure passage formed in the valve body, the second control pressure passage in fluid communication with the first inlet port and the third piston chamber;

a second flow passage disposed between the second inlet port, the outlet port, and the third piston chamber;

a first check valve disposed within the flow body between the first inlet port and the outlet port, the first check valve moveable between a closed position and an open position;

a second check valve disposed within the flow body between the second inlet port and the outlet port, the second check valve moveable between a closed position and an open position;

a first flow regulating valve disposed within the flow body between the third inlet port and the outlet port, and further disposed within the first piston chamber, the second piston chamber, and the first flow passage, the first flow regulating valve movable between a plurality of open positions and a closed position based in part on fluid pressures in the first piston chamber and the second piston chamber; and a second flow regulating valve disposed within the flow body between the second check valve and the outlet port, and further disposed within the third piston chamber and the second flow passage, the second flow regulating valve movable between a plurality of open positions and a closed position based in part on fluid pressures in the third piston chamber and the second flow passage, wherein:

the third inlet port is in fluid communication with the outlet port when the first flow regulating valve is in one of the plurality of open positions, the third inlet port is fluidly isolated from the outlet port when the first flow regulating valve is in the closed position, the second inlet port is in fluid communication with the outlet port when (i) the second flow regulating valve is in one of its plurality of open positions and (ii) the second check valve is in one of its plurality of open positions, and the second inlet port is fluidly isolated from the outlet port when the second check valve is in the closed position, regardless of the position of the second flow regulating valve.

10. The bleed air selector valve of claim 9, wherein:

the first flow regulating valve comprises a first control piston, a second control piston, and a first valve element;

the first control piston is movably disposed within the first piston chamber;

the second control piston is movably disposed within the second piston chamber; and the valve element is disposed within the first flow passage.

11. The bleed air selector valve of claim 10, further comprising:

a first bias spring disposed within the first piston chamber and engaging the first control piston, the first bias spring supplying a force that urges the first flow regulating valve toward an open position.

12. The bleed air selector valve of claim 9, further comprising:

a first thermostatic control passage having a first thermostatic control passage inlet and a first thermostatic control passage outlet, the first thermostatic control passage inlet in fluid communication with the second piston chamber;

a first thermostatic control valve disposed within the first thermostatic control passage between the first thermostatic control passage inlet and the first thermostatic control passage outlet, the first thermostatic control valve movable between a closed position, in which the first thermostatic control passage inlet is fluidly isolated from the first thermostatic control passage outlet, and a plurality of open positions, in which the first thermostatic control passage inlet is in fluid communication with the first thermostatic control passage outlet; and a first temperature sensitive actuator disposed at least partially in the outlet port and coupled to the first thermostatic control valve, the first temperature actuator responsive to fluid temperature in the outlet port to move the first thermostatic control valve, wherein the first temperature sensitive actuator and the first thermostatic control valve are configured such that the first temperature sensitive actuator moves the first thermostatic control valve toward the closed position as temperature increases.

13. The bleed air selector valve of claim 9, wherein:

the second flow regulating valve comprises a third control piston and a second valve element;

the third control piston is movably disposed within the third piston chamber; and the second valve element is disposed within the second flow passage.

14. The bleed air selector valve of claim 13, further comprising:

a second bias spring disposed within the third piston chamber and engaging the third control piston, the second bias spring supplying a force that urges the second flow regulating valve toward an open position.

15. The bleed air selector valve of claim 9, further comprising:

a second thermostatic control passage having a second thermostatic control passage inlet and a second thermostatic control passage outlet, the second thermostatic control passage inlet in fluid communication with the third piston chamber;

a second thermostatic control valve disposed within the second thermostatic control passage between the second thermostatic control passage inlet and the second thermostatic control passage outlet, the second thermostatic control valve movable between a closed position, in which the second thermostatic control passage inlet is fluidly isolated from the second thermostatic control passage outlet, and a plurality of open positions, in which the second thermostatic control passage inlet is in fluid communication with the second thermostatic control passage outlet; and a second temperature sensitive actuator disposed at least partially in the outlet port and coupled to the second thermostatic control valve, the second temperature actuator responsive to fluid temperature in the outlet port to move the second thermostatic control valve, wherein the second temperature sensitive actuator and the second thermostatic control valve are configured such that the second temperature sensitive actuator moves the second thermostatic control valve toward more open positions as temperature increases.

16. A bleed air selector valve, comprising:

a flow body having a first inlet port, a second inlet port, a third inlet port, and an outlet port;

a first piston chamber formed in the valve body and having a first vent opening;

a second piston chamber formed in the valve body and spaced apart from the first piston chamber;

a third piston chamber formed in the valve body and spaced apart from the first and second piston chambers;

a first control pressure passage formed in the valve body, the first control pressure passage in fluid communication with the third inlet port and the second piston chamber;

a first flow passage disposed between the third inlet port, the outlet port, the first piston chamber, and the second piston chamber;

a second control pressure passage formed in the valve body, the second control pressure passage in fluid communication with the first inlet port and the third piston chamber;

a second flow passage disposed between the second inlet port, the outlet port, and the third piston chamber;

a first check valve disposed within the flow body between the first inlet port and the outlet port, the first check valve moveable between a closed position and an open position;

a second check valve disposed within the flow body between the second inlet port and the outlet port, the second check valve moveable between a closed position and an open position;

a first flow regulating valve disposed within the flow body between the third inlet port and the outlet port, and further disposed within the first piston chamber, the second piston chamber, and the first flow passage, the first flow regulating valve movable between a plurality of open positions and a closed position based in part on fluid pressures in the first piston chamber and the second piston chamber;

a second flow regulating valve disposed within the flow body between the second check valve and the outlet port, and further disposed within the third piston chamber and the second flow passage, the second flow regulating valve movable between a plurality of open positions and a closed position based in part on fluid pressures in the third piston chamber and the second flow passage;

a first thermostatic control passage having a first thermostatic control passage inlet and a first thermostatic control passage outlet, the first thermostatic control passage inlet in fluid communication with the second piston chamber;

a first thermostatic control valve disposed within the first thermostatic control passage between the first thermostatic control passage inlet and the first thermostatic control passage outlet, the first thermostatic control valve movable between a closed position, in which the first thermostatic control passage inlet is fluidly isolated from the first thermostatic control passage outlet, and a plurality of open positions, in which the first thermostatic control passage inlet is in fluid communication with the first thermostatic control passage outlet;

a first temperature sensitive actuator disposed at least partially in the outlet port and coupled to the first thermostatic control valve, the first temperature actuator responsive to fluid temperature in the outlet port to move the first thermostatic control valve;

a second thermostatic control passage having a second thermostatic control passage inlet and a second thermostatic control passage outlet, the second thermostatic control passage inlet in fluid communication with the third piston chamber;

a second thermostatic control valve disposed within the second thermostatic control passage between the second thermostatic control passage inlet and the second thermostatic control passage outlet, the second thermostatic control valve movable between a closed position, in which the second thermostatic control passage inlet is fluidly isolated from the second thermostatic control passage outlet, and a plurality of open positions, in which the second thermostatic control passage inlet is in fluid communication with the second thermostatic control passage outlet; and a second temperature sensitive actuator disposed at least partially in the outlet port and coupled to the second thermostatic control valve, the second temperature actuator responsive to fluid temperature in the outlet port to move the second thermostatic control valve, wherein:

the third inlet port is in fluid communication with the outlet port when the first flow regulating valve is in one of the plurality of open positions, the third inlet port is fluidly isolated from the outlet port when the first flow regulating valve is in the closed position, the second inlet port is in fluid communication with the outlet port when (i) the second flow regulating valve is in one of its plurality of open positions and (ii) the second check valve is in one of its plurality of open positions, the second inlet port is fluidly isolated from the outlet port when the second check valve is in the closed position, regardless of the position of the second flow regulating valve, the first temperature sensitive actuator and the first thermostatic control valve are configured such that the first temperature sensitive actuator moves the first thermostatic control valve toward the closed position as temperature increases, and the second temperature sensitive actuator and the second thermostatic control valve are configured such that the second temperature sensitive actuator moves the second thermostatic control valve toward more open positions as temperature increases.

17. The bleed air selector valve of claim 16, wherein:
the first flow regulating valve comprises a first control piston, a second control piston, a first bias spring, and a first valve element;
the first control piston is movably disposed within the first piston chamber;
the second control piston is movably disposed within the second piston chamber;
the first bias spring is disposed within the first piston chamber and engages the first control piston,
the first bias spring supplies a force that urges the first flow regulating valve toward an open position; and
the valve element is disposed within the first flow passage.

18. The bleed air selector valve of claim 16, wherein:
the second flow regulating valve comprises a third control piston, a second bias spring, and a second valve element;
the third control piston is movably disposed within the third piston chamber;
the second bias spring is disposed within the third piston chamber and engages the third control piston;
the second bias spring supplies a force that urges the second flow regulating valve toward an open position; and
the second valve element is disposed within the second flow passage.

* * * * *